US012561208B2

(12) United States Patent
Gupta et al.

(10) Patent No.: US 12,561,208 B2
(45) Date of Patent: Feb. 24, 2026

(54) TECHNIQUE TO COMPUTE DELTAS BETWEEN ANY TWO ARBITRARY SNAPSHOTS IN A DEEP SNAPSHOT REPOSITORY

(71) Applicant: Nutanix, Inc., San Jose, CA (US)

(72) Inventors: Abhishek Gupta, Vasundhara Ghaziabad (IN); Andrey Alexseyevich Pyatkov, Seattle, WA (US); Angshuman Bezbaruah, Redmond, WA (US); Artem Yevgenyevich Livshits, Bellevue, WA (US); Brajesh Kumar Shrivastava, Bihar (IN); Akshay Pandita, Jammu and Kashmir (IN); Manan Shah, Newark, CA (US)

(73) Assignee: Nutanix, Inc., San Jose, CA (US)

( * ) Notice: Subject to any disclaimer, the term of this patent is extended or adjusted under 35 U.S.C. 154(b) by 81 days.

(21) Appl. No.: 18/239,960

(22) Filed: Aug. 30, 2023

(65) Prior Publication Data

US 2024/0311254 A1 Sep. 19, 2024

(30) Foreign Application Priority Data

Mar. 15, 2023 (IN) .............................. 202341017508

(51) Int. Cl.
*G06F 16/00* (2019.01)
*G06F 11/1446* (2026.01)
(52) U.S. Cl.
CPC ...... *G06F 11/1446* (2013.01); *G06F 2201/84* (2013.01)

(58) Field of Classification Search
CPC .. G06F 16/2246; G06F 16/2477; G06F 40/14; G06F 16/81; H04L 9/0869
See application file for complete search history.

(56) References Cited

U.S. PATENT DOCUMENTS

| | | | |
|---|---|---|---|
| 6,665,815 | B1 | 12/2003 | Goldstein et al. |
| 7,577,807 | B2 | 8/2009 | Rowan et al. |
| 7,818,299 | B1 | 10/2010 | Federwisch et al. |
| 8,549,518 | B1 | 10/2013 | Aron et al. |
| 8,601,473 | B1 | 12/2013 | Aron et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Dinku W Gebresenbet
(74) *Attorney, Agent, or Firm* — Cesari and McKenna, LLP

(57) ABSTRACT

A differencing technique enables efficient retrieval of data from one of a substantial number of point-in-time images (e.g., snapshots) maintained over substantially long periods of time in a long-term storage service (LTSS) of an archival storage system. The LTSS efficiently retrieves the data by computing differences or deltas between any two arbitrary snapshots in accordance with a differencing procedure. According to the technique, the differencing procedure operates on one or more index tree structures configured to translate a logical offset range of snapshot data in a snapshot address space (e.g., of a file system) to a data object address space (e.g., of an object store hosting the snapshot data).

27 Claims, 10 Drawing Sheets

(56) References Cited

U.S. PATENT DOCUMENTS

| | | | | |
|---|---|---|---|---|
| 8,850,130 | B1 | 9/2014 | Aron et al. | |
| 8,863,124 | B1 | 10/2014 | Aron et al. | |
| 9,009,106 | B1 | 4/2015 | Aron et al. | |
| 9,069,708 | B2 | 6/2015 | Gill et al. | |
| 9,268,602 | B2 | 2/2016 | Prahlad et al. | |
| 9,336,132 | B1 | 5/2016 | Aron et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 10,866,869 | B2 | 12/2020 | Li | |
| 11,436,097 | B1 | 9/2022 | Kumar et al. | |
| 11,575,745 | B2 | 2/2023 | Tatiparthi et al. | |
| 11,953,999 | B2 | 4/2024 | Kumar | |
| 2013/0227236 | A1* | 8/2013 | Flynn | G06F 12/0292 711/172 |
| 2014/0052953 | A1* | 2/2014 | Ben-Tsion | G06F 3/0605 711/172 |
| 2019/0065508 | A1* | 2/2019 | Guturi | G06F 16/9027 |
| 2021/0294777 | A1 | 9/2021 | Maybee et al. | |
| 2022/0030901 | A1 | 2/2022 | Durand et al. | |
| 2022/0222146 | A1 | 7/2022 | Marivoet | |
| 2022/0263897 | A1 | 8/2022 | Karr et al. | |
| 2022/0398163 | A1 | 12/2022 | Bezbaruah et al. | |
| 2024/0143462 | A1 | 5/2024 | Jain et al. | |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http://stevenpoitras.com/ the-nutanix-bible/ Oct. 15, 2013 (Publication date based on indicated capture date by Archive.org first publication date unknown) pp. all.

Poitras, Steven "The Nutanix Bible—Classic Edition" from https:// nutanixbible.com/, dated May 21, 2024, 268 pages.

* cited by examiner

TECHNIQUE TO COMPUTE DELTAS BETWEEN ANY TWO ARBITRARY SNAPSHOTS IN A DEEP SNAPSHOT REPOSITORY

CROSS-REFERENCE TO RELATED APPLICATION

The present application claims the benefit of India Provisional ₅ Patent Application Serial No. 202341017508, which was filed on Mar. 15, 2023, by Abhishek Gupta, et al. for TECHNIQUE TO COMPUTE DELTAS BETWEEN ANY TWO ARBITRARY SNAPSHOTS IN A DEEP SNAPSHOT REPOSITORY, which is hereby incorporated by reference.

BACKGROUND

Technical Field

The present disclosure relates to archival of data and, more specifically, to efficient retrieval of snapshot data in an archival storage system.

Background Information

File systems are primarily configured to process (i.e., store and retrieve) active input/output (I/O) data accesses to a virtual disk (vdisk) issued by, e.g., a user application executing in a virtual machine of a storage system. The user application and its processed data accesses may be designated as a category of data for backup and protected by generating one or more snapshots. Conventionally, file systems use bitmaps or other metadata structures to track differences between snapshots by, e.g., dividing a snapshot address space of the file systems into blocks and marking or associating with metadata those blocks that changed between snapshots. When computing differences between two snapshots, the bitmaps/metadata of the two snapshots, as well as the bitmaps/metadata of any intervening snapshots may be logically manipulated to acquire a super-set of the bitmap changes or differences.

The file system may be used to retrieve large numbers of snapshots archived over long periods of time and may retain all of the snapshots on low-cost storage, e.g., cloud-based object stores, of a secondary site for the long periods of time in accordance with, e.g., compliance and/or regulatory use cases. As a result, retrieval of old snapshot data from a storage service at the secondary site typically requires computing differences between a recent snapshot and substantially old snapshots having a large number of intervening snapshots. Moreover, computing differences involves retrieval and logical manipulation of a substantial number of bitmaps/metadata (e.g., the intervening snapshots between the substantially old and recent snapshots) which is very computationally costly; the cost of computing differences (Δs) is usually directly proportional to the time/distance between the snapshots used to compute the Δs. As such, there is a need to determine changes between two snapshots having a large number of intervening snapshots without the need to examine/traverse bitmaps/metadata of those intervening snapshots.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a differencing technique that enables efficient retrieval of data from one of a substantial number of point-in-time images (e.g., snapshots) maintained over substantially long periods of time in a long-term storage service (LTSS) of an archival storage system. The LTSS efficiently retrieves the data by computing differences or deltas between any two arbitrary snapshots possibly having a large number of intervening snapshots in accordance with a differencing procedure. According to the technique, the differencing procedure operates on one or more index data structures configured to translate a logical offset range of snapshot data in a snapshot address space (e.g., of a file system) to a data object address space (e.g., of an object store hosting the snapshot data). Notably, the index data structures are separate from the snapshots and may be stored apart from them, so that no metadata of the snapshots (i.e., the arbitrary snapshots or any intervening snapshots) need be examined to determine which blocks of data have changed (i.e., the deltas) between the two arbitrary snapshots.

In an embodiment, each snapshot is associated with its own index data (B+ tree) structure. By referencing/accessing a root node of each index data structure (e.g., the reference snapshot index tree and the restored snapshot index tree) and traversing internal and leaf nodes of the B+ trees to determine the deltas (Δs) at a high level, the differencing technique arrives at changed data blocks approximately in constant time. Note that the differences are determined by eliminating common nodes in the index data structures. The differencing technique is simple and efficient for computing differences (the Δs) between only two arbitrary snapshots, regardless of how far apart in time/distance (i.e., no matter how many intervening snapshots exist or an amount of archived changed data blocks), by comparing the index data structure nodes.

In an embodiment, the differencing technique involves a 2-phase differing analysis that includes an initial differing comparison in a virtual address space of the snapshots, i.e., in the file system native (original) to the snapshots, to determine virtual address blocks that are different, and then a subsequent differing comparison in a physical address space of the data objects (e.g., in the object store) storing those different blocks to determine their physical addresses for retrieving the actual deltas (Δs) or changed data. The technique thus eliminates (removes) any common nodes (associated with unchanged blocks) at all levels of the restored and reference snapshot index trees and, ultimately, retains only the leaf node entries that are unique to the restored snapshot (and not present in the reference snapshot), so that merely blocks unique to the restored snapshot need be retrieved from the data objects.

DESCRIPTION

Figure 1:
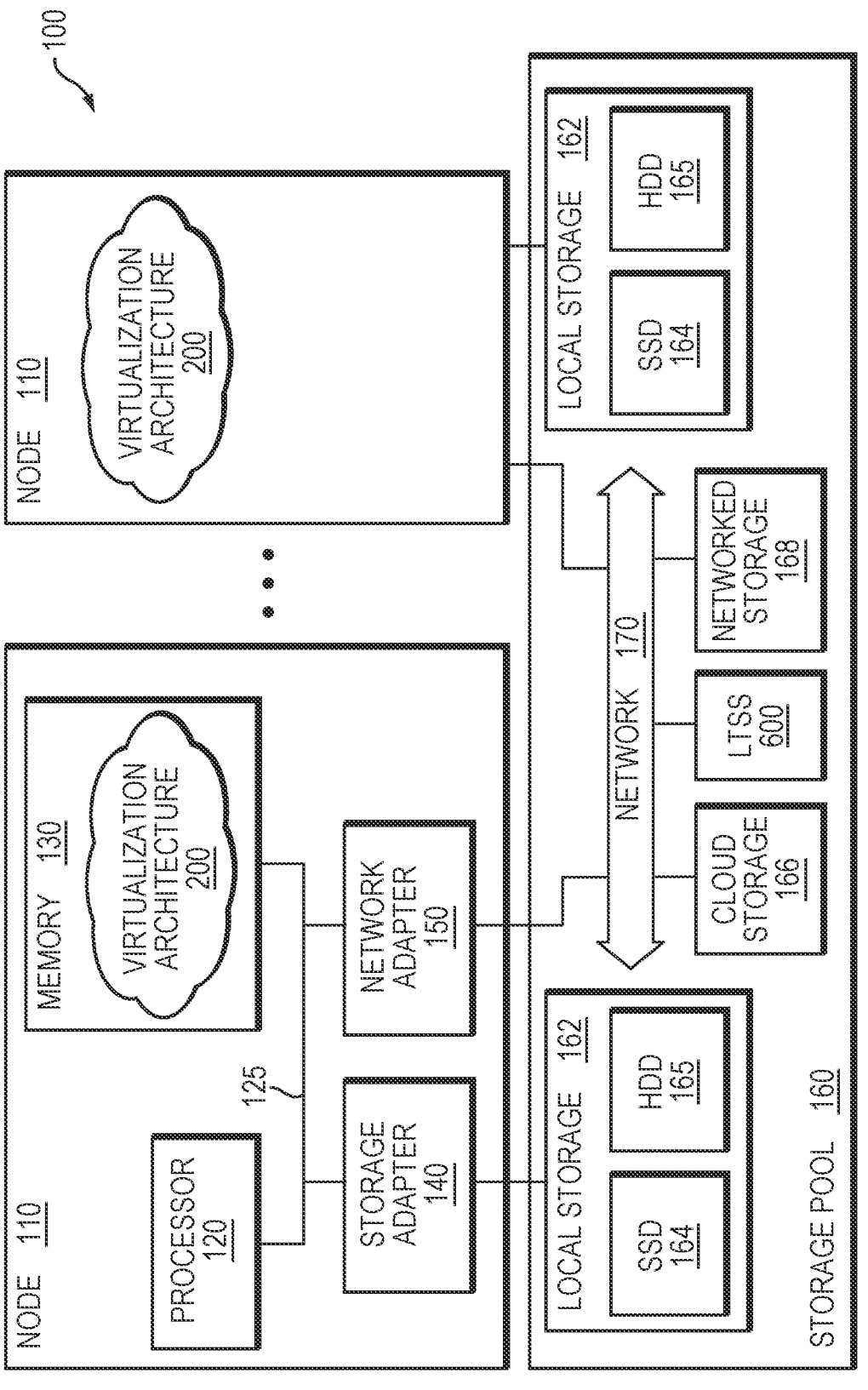
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 600) of an archival storage system provides storage of large numbers (amounts) of point-in-time images or recovery points (i.e., snapshots) of application workloads on an object store. Communication over the network 170 may be affected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
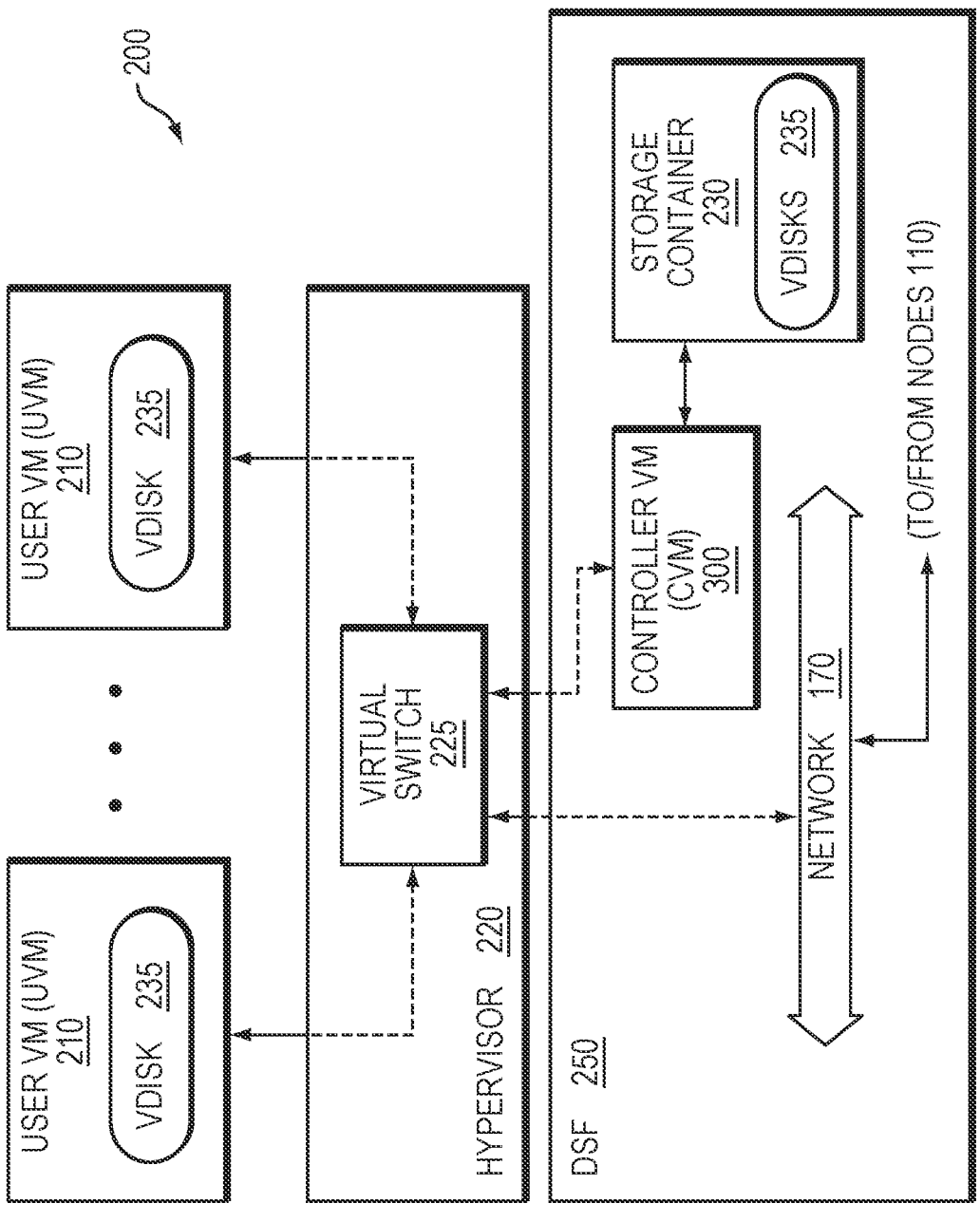
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor. Microsoft's Hyper-V. RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster wide.

The client software (e.g., one or more user applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI. CIFS or NES and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an ISCSI LUN or a file served by an NES or CIFS server. An ISCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
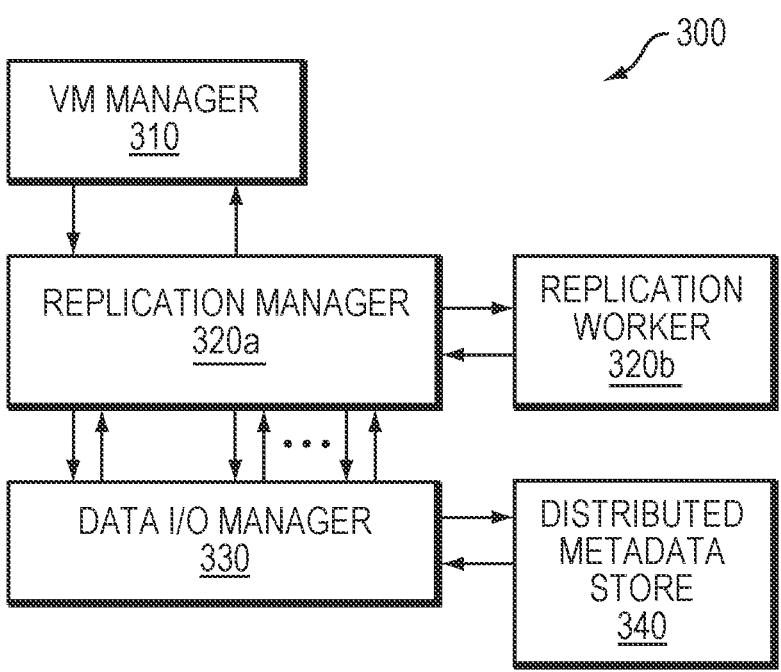
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition, and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery capabilities of DSF 250. Such capabilities include migration/failover of virtual machines and containers as well as scheduling of snapshots. In an embodiment, the replication manager 320a may interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O) manager 330 presents a vdisk 235 to the UVM 210 in order to service I/O access requests by the UVM to the DFS. In an embodiment, the data I/O manager 330 and replication manager 320 cooperate with DSF 250 to schedule and generate, i.e., provide support for, snapshots, which are point-in-time copies of storage objects, such as files, LUNs and/or vdisks. A distributed metadata store 340 stores and manages all metadata in the node/cluster, including metadata structures that store metadata used to locate (map) the actual content of vdisks on the storage devices of the cluster.

Data replication generally involves copying or replicating data among one or more nodes 110 of clusters 100 embodied as, e.g., datacenters to enable continued operation of data processing operations in a multi-site data replication environment, such as backup and/or archival storage. The multi-site data replication environment includes two or more datacenters, i.e., sites, which may be geographically separated and connected over a communication network, such as a WAN. For example, data at a local datacenter (primary site) may be replicated over the network to a remote datacenter (secondary site) located at a geographically separated distance to ensure access to the data and continuity of data processing operations in the event of, e.g., a failure of the nodes at the primary site.

Synchronous replication may be used to replicate the data between the sites such that each update to the data at the primary site is copied to the secondary site. For instance, every update (e.g., write operation) issued by a UVM 210 to data designated for backup (i.e., backup data) is continuously replicated from the primary site to the secondary site before the write operation is acknowledged to the UVM. Thus, if the primary site fails, the secondary site has an exact (i.e., mirror copy) of the backup data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the backup data.

In the absence of continuous synchronous replication between the sites, the current state of the backup data at the secondary site always "lags behind" (is not synchronized with) that of the primary site resulting in possible data loss in the event of a failure of the primary site. If a specified amount of time lag in synchronization is tolerable, then asynchronous (incremental) replication may be selected between the sites, for example, a point-in-time image replication from the primary site to the secondary site. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data backup and/or protection environment, a base snapshot is required at each site. Note that the data may include an entire state of a virtual machine including associated storage objects.

Figure 4:
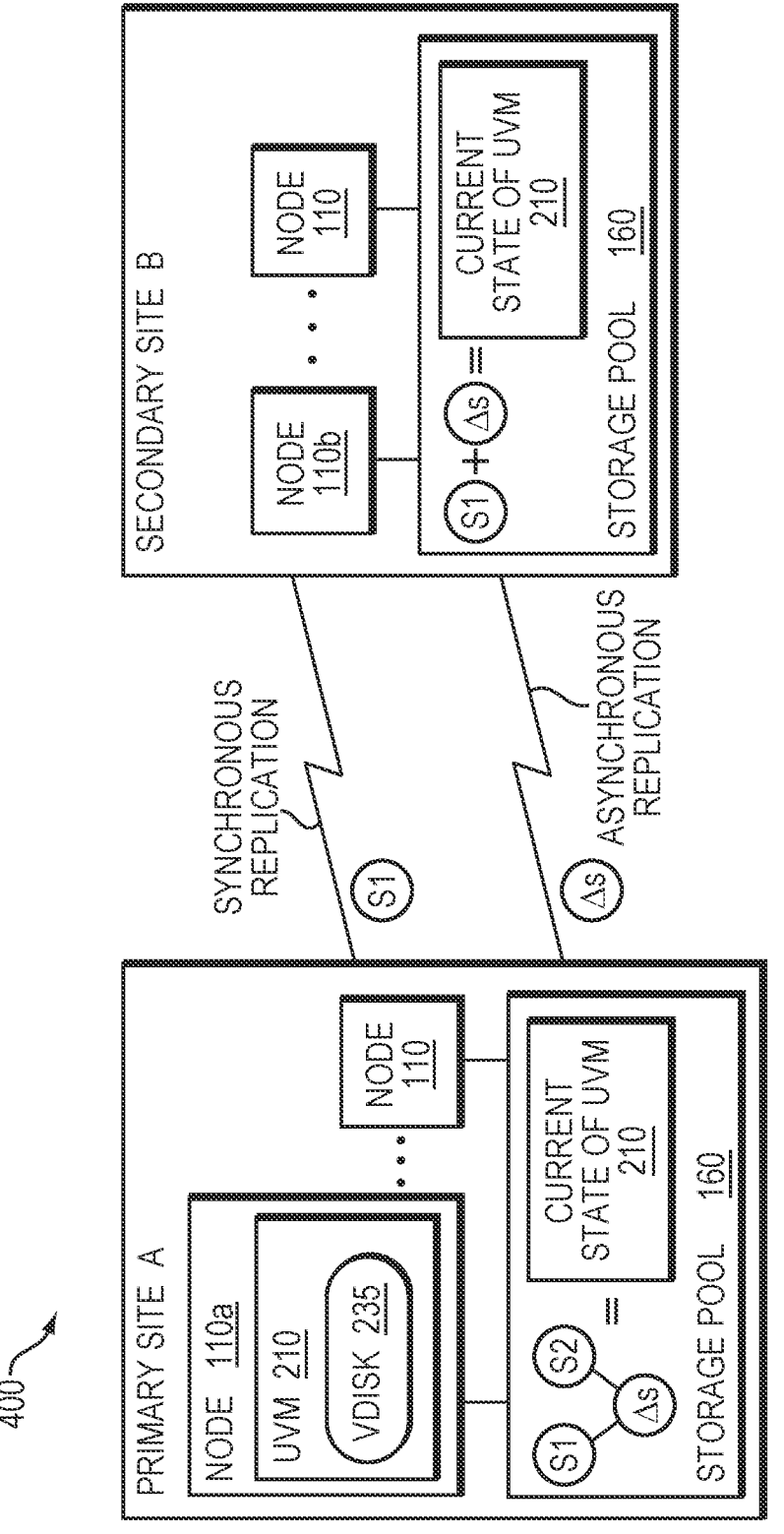
FIG. 4 is a block diagram of an exemplary multi-site data replication environment configured for use in various deployments, such as for backup and/or archival storage.

FIG. 4 is a block diagram of an exemplary multi-site data replication environment configured for use in various deployments, such as for backup and/or archival storage. Illustratively, the multi-site environment 400 includes two sites: primary site A and secondary site B, wherein each site represents a datacenter embodied as a cluster 100 having one or more nodes 110. A category of data (e.g., one or more UVMs 210) running on primary node 110*a* at primary site A is designated for backup to secondary site B (e.g., secondary node 110*b*). A first snapshot S1 of the data is generated at the primary site A and replicated (e.g., via synchronous replication) to secondary site B as a base or "common" snapshot S1. A period of time later, a second snapshot S2 may be generated at primary site A to reflect a current state of the data (e.g., UVM 210). Since the common snapshot S1 exists at sites A and B, only incremental changes (deltas Δs) to the data designated for backup need be sent (e.g., via asynchronous replication) to site B, which applies the deltas (Δs) to S1 so as to synchronize the state of the UVM 210 to the time of the snapshot S2 at the primary site. A tolerance of how long before data loss will exceed what is acceptable may determine (i.e., impose) a frequency of snapshots and replication of deltas to the backup site, e.g., a data loss tolerance of 60 mins requires snapshots with commensurate delta replication every 60 mins—deemed a Recovery Point Objective (RPO) of 60 minutes.

For asynchronous replication, incremental changes (deltas Δs) to the backup data (e.g., using subsequent snapshots as described herein) are sent from primary site A to secondary site B, which applies the deltas (Δs) to S1 to establish an "async" recovery point (RP). For such a replication combination, a schedule of a protection policy may be computed that ensures retention of least "n" recovery points, where n is the RPO periodicity of the asynchronous recovery points.

Thus, regardless of the type of replication, the schedule may be computed that defines parameters such as the frequency at which common snapshots are periodically generated as (i) mirroring references for synchronous replication between sites A and B, or (ii) incremental changes/identifiers for asynchronous replication between sites A and B. The computed schedule also defines parameters such as the number of snapshots needed to be retained (i.e., retention) at each site so as to provide a latest common snapshot used as the recovery point.

Figure 5:
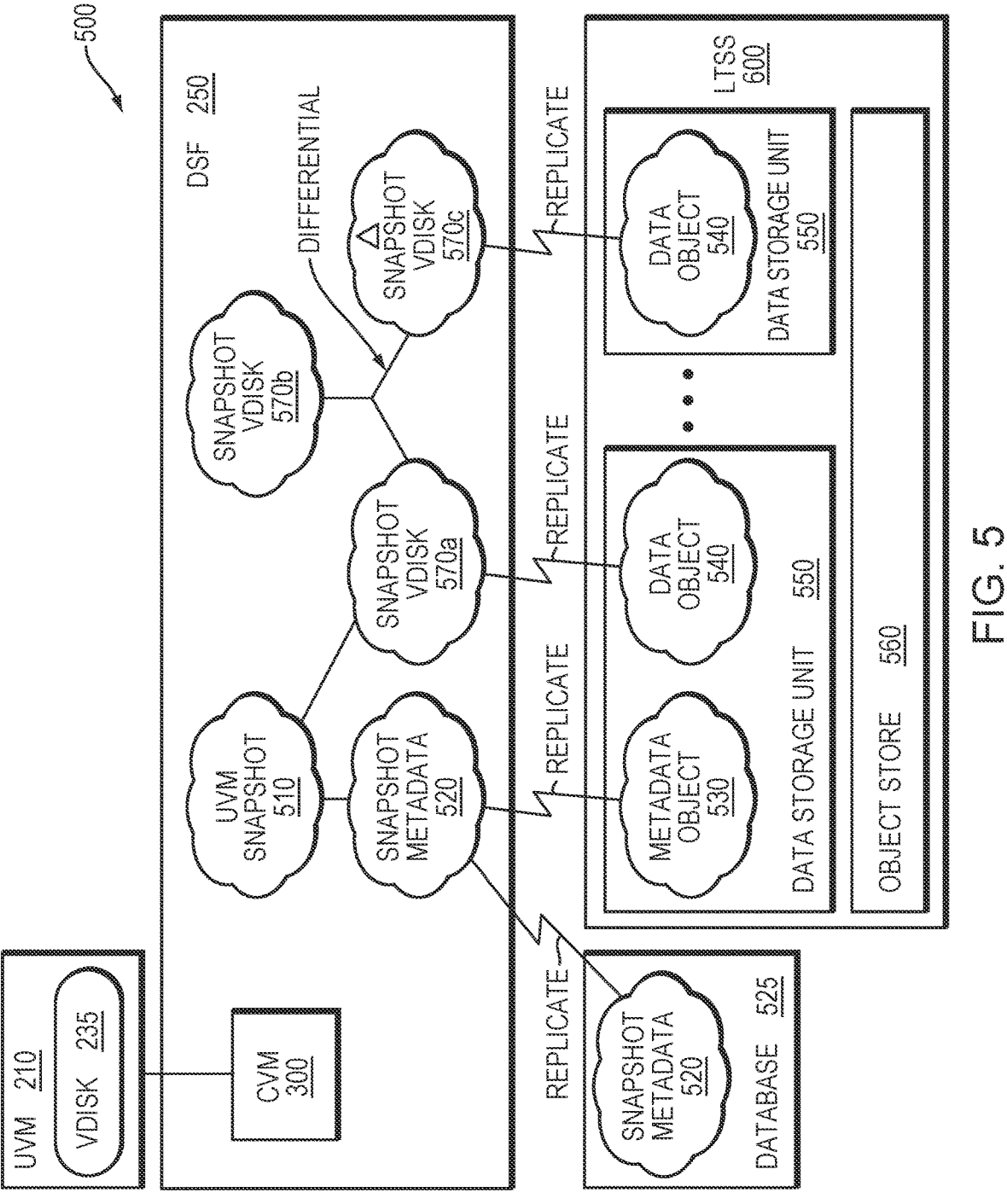
FIG. 5 is a block diagram of an exemplary data replication environment configured to replicate snapshots for storage to a long-term storage service (LTSS) of an archival storage system.

The embodiments described herein are related to an indexing technique configured to provide an index data structure for efficient retrieval of data of a snapshot from the LTSS of the archival storage system. FIG. 5 is a block diagram of an exemplary data replication environment 500 configured to replicate snapshots for storage to the LTSS of the archival storage system. The architecture of LTSS 600 is configured to process large amounts of point-in-time images or recovery points (i.e., snapshots) of application workloads for storage on an object store 560 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 600 may be a distributed file system of a storage system (e.g., CVM 300 of DSF 250) that generates snapshots of the UVM (e.g., data processed by a user application running in the UVM) and replicates the UVM snapshot 510 for storage in the object store 560. Replication, in this context, is directed to storage devices that exhibit incremental, block-level changes. LTSS 600 is thus a "generic" long-term storage service of an archival/backup storage system from the perspective of the client, i.e., the client flushes (delivers) data blocks of UVM snapshots 510 to the LTSS 600, which organizes the blocks for long-term storage within objects of the object store 560. Each UVM snapshot 510 is generally handled as a data storage unit 550 by LTSS 600.

Illustratively, the content of each UVM snapshot 510 includes snapshot metadata and snapshot data, wherein the snapshot metadata 520 is essentially configuration information describing the logical entity (e.g., UVM 210) in terms of, e.g., virtual processor, memory, network, and storage device resources of the UVM. The snapshot metadata 520 of the UVM 210 is illustratively replicated for storage in a query-able database 525 although, in an embodiment, the snapshot metadata 520 may be further replicated and organized as a metadata object 530 within a configuration namespace (e.g., bucket) of the object store 560 of LTSS 600 for long-term durability and availability. The data of the UVM 210 is virtualized as a disk (e.g., vdisk 235) and, upon generation of a snapshot, is processed as snapshot vdisk 570 of the UVM 210. The snapshot vdisk 570 is replicated, organized, and arranged as one or more data objects 540 of the data storage unit 550 for storage in the object store 560. The data is stored on a storage device of the object store as extents (i.e., contiguous data slices). Each extent of the snapshot vdisk 570 is a contiguous range of address space within a data object 540, wherein the extents are "packed" into the data object 540 and accessible by, e.g., offsets and lengths. Note that a preferred size (e.g., 16 MB) of each data object 540 may be specified by the object store/vendor (e.g., AWS S3 cloud storage) for optimal use of the object store/vendor.

Operationally, the client initially generates a full snapshot of vdisk 235 (e.g., snapshot vdisk 570*a*) and transmits copies (i.e., replicas) of its data blocks to effectively replicate the snapshot vdisk 570a to LTSS 600. The snapshot vdisk 570a is thereafter used as a reference snapshot for comparison with one or more subsequent snapshots of the vdisk 235 (e.g., snapshot vdisk 570b) when computing incremental differences (deltas Δs). To support a RPO, the client (e.g., CVM 300) generates the subsequent vdisk snapshots 570b at predetermined (periodic) time intervals and computes the deltas of these periodically generated snapshots with respect to the reference snapshot. The CVM 300 transmits replicas of data blocks of these deltas as Δ snapshot vdisk 570c to LTSS. Note that from the perspective of the CVM 300, the LTSS 600 is a storage entity having an address on the network 170 (or WAN), similar to any networked storage 168. However, unlike networked storage 168, which is generally exposed to (accessed by) the CVM 300 using filesystem protocols such as NFS. CIFS and iSCSI, the LTSS 600 is accessed using specialized application program interfaces (APIs) referred to herein as replication APIs, which have rich descriptive semantics for managing, storing, and retrieving the snapshots retained in the LTSS. For example, a replication API may specify the snapshotted vdisk 570a of the logical entity (e.g., UVM 210) as well as information describing the snapshot metadata 520 and snapshot vdisk 570a of the entity for locating and storing or retrieving data from the LTSS. The CVM 300 then transmits (replicates) a stream of data blocks of the snapshotted vdisk 570a to LTSS 600.

Figure 6:
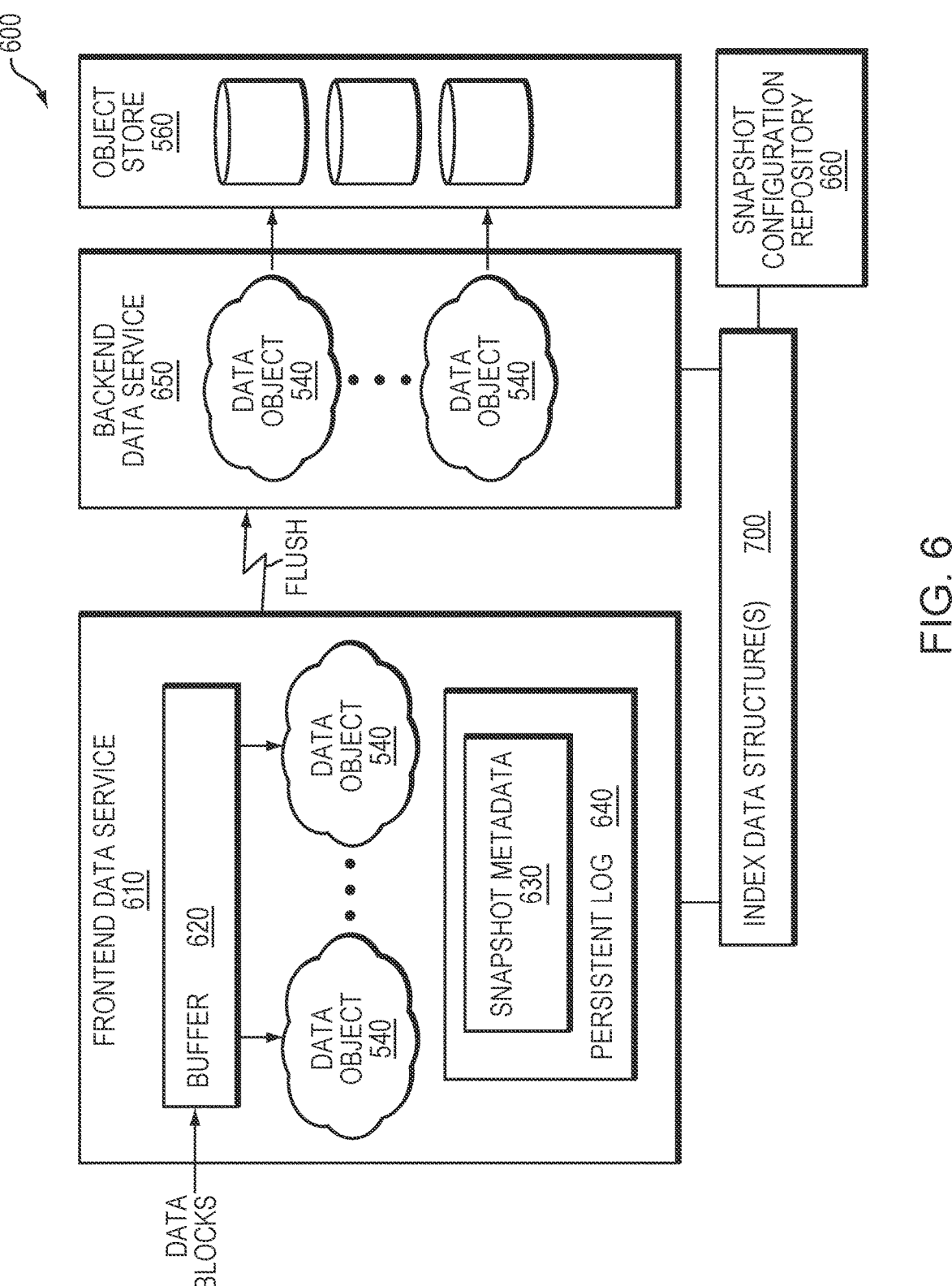
FIG. 6 is a block diagram of the LTSS of the archival storage system.

FIG. 6 is a block diagram of the LTSS 600 of the archival storage system. Illustratively, the LTSS 600 includes two data services (processes): a frontend data service 610 that cooperates with the client (e.g., CVM 300) to organize large amounts of the replicated snapshot data (data blocks) into data objects 540 and a backend data service 650 that provides an interface for storing the data objects 540 in the object store 560. In an embodiment, the LTSS data services/processes may execute on a computing platform at any location (e.g., may be geographically separate from a location of the object store) and is generally "stateless" as all data/metadata are stored on the object store 560. That is, the LTSS is a serverless transactional service that may execute anywhere that has a network connection to the object store and the CVM. Accordingly, the frontend data service 610 and backend data service 650 may run either locally on a node of an "on-prem" cluster or remotely on a node of an "in-cloud" cluster. In response to receiving an initial replication API directed to the snapshot vdisk 570a, the frontend data service 610 temporarily stores the stream of data blocks of the snapshot vdisk 570a, e.g., in a buffer 620 and writes the data blocks into one or more extents (i.e., contiguous, non-overlapping, variable-length regions of the vdisk) for storage in data objects 540 of a preferred size (e.g., 16 MB) as specified by the object store vendor for optimal use. The frontend data service 610 then forwards (flushes) the data objects 540 to the backend data service 650 for storage in the object store 560 (e.g., AWS S3). In response to receiving a subsequent replication API directed to the Δ snapshot vdisk 570c, the frontend data service temporarily stores the stream of data blocks of the Δ snapshot vdisk 570c in buffer 620, writes those data blocks to one or more data objects 540, and flushes the objects to the backend data service 650.

Prior to flushing the data objects 540 to the backend data service 650, the frontend data service 610 creates metadata that keeps track of the amount of data blocks received from the CVM 300 for each replicated snapshot, e.g., snapshot vdisk 570a as well as Δ snapshot vdisk 570c. The metadata associated with the snapshot (i.e., snapshot metadata 630) is recorded as an entry in persistent storage media (e.g., a persistent log 640) local to the frontend data service 610. The snapshot metadata 630 includes information describing the snapshot data, e.g., a logical offset range of the snapshot vdisk 570. In an embodiment, the snapshot metadata 630 is stored as an entry of the persistent log 640 in a format such as, e.g., snapshot ID, logical offset range of snapshot data, logical offset into the data object to support storing multiple extents into a data object, and data object ID. The frontend data service 610 updates the snapshot metadata 630 of the log entry for each data object 540 flushed to the backend data service 650 and maintains offset of the data object where extents of the snapshot are stored. Notably, the snapshot metadata 630 is used to construct the index data structure 700 of LTSS.

Illustratively, the index data structure 700 is configured to enable efficient identification (location) and retrieval of data blocks of the snapshots contained within numerous data objects 540 stored on the object store 560. Effectively, the index data structure acts as an independent database organized to retrieve data by extent of a vdisk (as recorded in the associated object store of the archival storage system) according to any snapshot. In essence, the index metadata structure is a searchable mapping of snapshot extents to objects (and offsets within those objects) of the object store. Notably, each snapshot is associated with a corresponding index data structure and may include incremental changes to a prior snapshot that may reference a prior index data structure associated with the prior snapshot. In this manner, only the incremental changes between snapshots need be stored in the archival storage system as indicated above, because later index data structures may reference (via prior index data structures) older blocks in prior snapshots.

Accordingly, the index data structure 700 may be extended to embody a plurality of "cloned," e.g., copy-on-write, index structures associated with many of the data objects 540 of LTSS 600 to enable the location and retrieval of the data blocks. To that end, a snapshot configuration repository 660 (e.g., database) is provided, e.g., on storage media local to the LTSS data services, to locate a snapshot index data structure that is dynamically query-able by the data services to select a snapshot (i.e., the repository is organized according to snapshot) and its corresponding index data structure 700 of a data object, e.g., from among the numerous (cloned) index data structures. Further, the repository 660 may also be stored on the object store 560 to ensure fault tolerance, durability, and availability.

In an embodiment, the snapshot configuration repository 660 is organized as a key-value store that provides a higher-level of indexing (i.e., higher than the actual index data structure) to resolve to a snapshot corresponding to a (cloned) index data structure used to retrieve one or more data blocks for data objects stored in the object store 560. The snapshot configuration repository 660 is managed separately from the object store (e.g., remote from the object store media) and points to roots of the (cloned) index structures associated with snapshot data objects (e.g., using a remote referencing mechanism such as a URL to a root node of a cloned index structure resident on object store media located on the network/internet.) Such remote referencing enables essentially infinite storage capacity of the LTSS object store, e.g., among various cloud service providers (CSPs) such as AWS, Google, Azure and the like, that is not limited by an address space (file space, namespace) of a (client) distributed file system. Note that the limited address space of such client file systems also limits the amount of "active" file system snapshots that can be maintained on the client's storage (such as a volume).

In an embodiment, the snapshot configuration repository 660 may be used as a search engine to enable efficient locating and retrieving of a data block from the selected object. Similar to the persistent log 640, the snapshot configuration repository 660 includes configuration information about each snapshot and associated data object as well as pointers to the roots of the index data structures for the data objects. The repository 660 may also be indexed by timestamp or VM/vdisk name of a snapshot. The snapshot may then be selected and a pointer to a root node of the corresponding index data structure 700 may be identified to access a specified logical offset range of a snapshot. Notably, the index data structure 700 is configured to translate (map) the logical offset range (address space) of data in the snapshot to the data object address space of the object store hosting the snapshot data to thereby enable efficient (i.e., bounded time) retrieval of the snapshot data from the object store independent of the number of snapshots.

Figure 7:
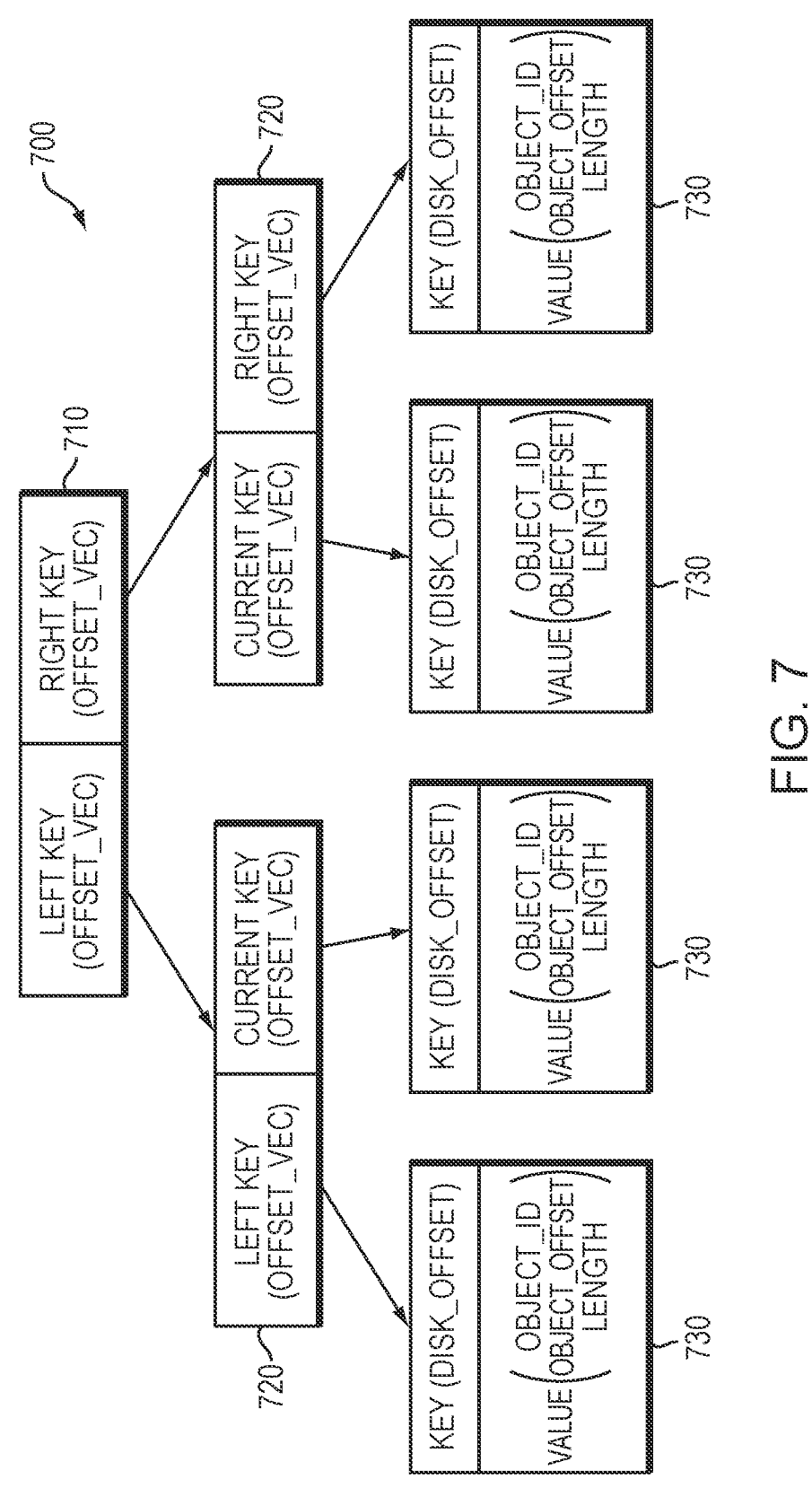
FIG. 7 is a block diagram illustrating an index data structure configured for efficient retrieval of snapshots from the LTSS of the archival storage system.

FIG. 7 is a block diagram illustrating the index data structure 700 configured for efficient retrieval of snapshots from the LTSS of the archival storage system. In one or more embodiments, the index data structure 700 is illustratively a balanced tree (e.g., a B+ tree) with a large branching factor for internal nodes to maintain a limited depth of the tree, although other types of data structures, such as bitmaps, heaps, and hashes, may be used with the embodiments described herein. When embodied as the B+ tree, the index data structure includes a root node 710, one or more intermediate (internal) nodes 720 and a plurality of leaf nodes 730. For the reference snapshot vdisk 570*a*, each internal node 720 contains a set of keys that specify logical offset ranges into the address space of the vdisk 570*a* and corresponding values that reference other nodes in the B+ tree (e.g., lower-level internal nodes or leaf nodes). Each leaf node 730 contains a value (or alternatively, a vector of values) describing (pointing to) a data object having the extent that includes the selected data blocks corresponding to the specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. The technique only requires traversing the depth of a (cloned) index data structure to find the leaf node 730 pointing to a selected data block of a particular snapshot within the address space of a data object in the object store. Notably, a large branching factor for nodes, e.g., 1024 (vector of values) for leaf nodes and 32×1024 (vector)=32K for internal nodes, permits a very large number of references in the internal nodes 720 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 720 contains keys and pointers to children nodes, and generally not any values. The root node 710 is a variant of the internal node 720 but similar to the internal node, contains disk offsets as keys. For each key, a left pointer points to data of the vdisk ranging from a left key to (and including) a current key; illustratively, data in a "child" internal node 720 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as a key; and (ii) Child_Pointer_Vec containing a pointer to a child node.

As indicated previously, the leaf node 730 may contain a vector (e.g., predetermined number) of segment descriptors (e.g., up to 1024), each of which describes the vdisk address space covered by the descriptor corresponding to information in the form of the following keys and values forming the descriptor for locating data in the object store:

Key (Disk_Offset)→Value (Object_ID, Object_Logical_Offset, Length)

wherein Disk_Offset refers to the offset within the vdisk; Object_ID identifies the data object in the archival storage system and may be a combination of a vdisk uuid (universally unique identifier) and an assigned predefined (e.g., 64-bit integer) number; Object_Logical_Offset is the logical offset with the object (specified by Object_ID) at which the data resides; and Length is the number of contiguous bytes (size of the extent) beginning at "Offset" (Disk_Offset) that is pointed to by the key entry.

Referring to FIGS. 5 and 6, assume the CVM 300 generates the reference snapshot as snapshot vdisk 570*a* for vdisk 235 and having a size of 1 TB with an assigned vdisk ID of, e.g., 1. The CVM 300 replicates the data blocks of the snapshot vdisk 570*a* to the LTSS 600 in accordance with a first replication API call that identifies the vdisk ID 1 and the snapshot vdisk 570*a* as, e.g., snapshot ID 1. In response to receiving the first replication API call, the frontend data service 610 "buffers" the changed data blocks to a preferred size (e.g., 16 MB) of the object store and writes the blocks into a plurality of ("n") data objects 540 assigned, e.g., data object IDs 1-n. The frontend data service 610 also records snapshot metadata 630 describing the written data blocks (e.g., vdisk ID 1, snapshot ID 1, logical offset range 0-1 TB, data object IDs 1a-n) to the persistent log 640. After all of the data blocks are replicated and flushed to the object store 560, the frontend data service 610 constructs one or more index data structures 700 for the snapshot vdisk 570*a* (i.e., a parent B+ tree) using the appropriate snapshot metadata 530 for snapshot ID 1.

Assume that at the predetermined time interval, the CVM 300 generates a subsequent snapshot for the vdisk 235 (e.g., snapshot vdisk 570*b*) and after specifying snapshot 570*a* as a reference snapshot and performing the incremental computation, determines that the deltas (changes) of data blocks between the snapshot vdisks 570*a,b* lie in the offset range of 1 MB-5 MB and 1 GB-2 GB of the reference snapshot (e.g., snapshot vdisk 470*a*). Such deltas may be determined for a series of snapshots. For example, the CVM 300 may issue a second replication API call to the LTSS 600 that identifies the vdisk ID 1, a first snapshot vdisk 570*b* as, e.g., snapshot ID 2, and the logical offset range of 1 MB-5 MB for the changed data blocks. The CVM 300 then replicates the delta data blocks to the LTSS 600. In response to receiving the first replication API call, the frontend data service 610 buffers the changed data blocks to a preferred size (e.g., 16 MB) and writes the blocks into a data object 540 assigned, e.g., an object ID 2. The frontend data service 610 also records snapshot metadata 630 describing the written data blocks (e.g., vdisk ID 1, snapshot ID 2, logical offset range 1 MB-5 MB, object ID 2) to the persistent log 640.

After all of the changed data blocks are replicated and flushed to the object store 560, the frontend data service 610 constructs an index data structure 700 for the first snapshot vdisk 570b using the appropriate snapshot metadata 630 for snapshot ID 2. Assume the changed data blocks at the logical offset range 1 MB-5 MB of the snapshot vdisk 570a fit within the data object (extent) referenced by a leaf node 730 of the parent B+ tree. A new, updated copy of the leaf node may be created to reflect the changed data blocks at the logical offset range while the remaining leaf nodes of the parent B+ tree remain undisturbed. Updated copies of the internal node(s) 720 referencing the logical offset range of the changed data blocks described by the updated leaf node may likewise be created. A new "cloned" B+ tree is thus constructed based on the parent B+ tree using a copy-on-write technique. The cloned B+ tree has a new root node 710a and internal nodes 720 that point partially to "old" leaf nodes 730 of the parent B+ tree as well as to the new leaf node 730a (not shown). Illustratively, the leaf node 730a is copied and then modified to reference the changed data. Effectively, the cloned B+ tree for the first & snapshot vdisk 570c is a "first child" B+ tree that shares internal and leaf nodes with the parent B+ tree.

The CVM 300 thereafter issues a third replication API call to the LTSS 600 that identifies the vdisk ID 1, a second Δ snapshot vdisk 570c as, e.g., snapshot ID 3, and the logical offset range of 1 GB-2 GB for the changed data blocks. The CVM 300 replicates the delta data blocks to the LTSS 600. In response to receiving the third replication API call, the frontend data service 610 buffers the changed data blocks to a preferred size (e.g., 16 MB) and writes the blocks into "n" data objects 540 assigned, e.g., object IDs 3a-n (not shown). The frontend data service 610 records snapshot metadata 630 describing the written data blocks (e.g., vdisk ID 1, snapshot ID 3, logical offset range 1 GB-2 GB, object IDs 3a-n) to the persistent log 640. After all of the changed data blocks are replicated and flushed to the object store 560, the frontend data service 610 constructs one or more second child B+ trees for the second Δ snapshot vdisk, as described above. Notably, a large branch factor of the B+ tree permits a very large number of references in the internal nodes of the B+ tree to support a correspondingly large number of changes between snapshots so that the index structure depth of the tree may be maintained at a maximum depth (e.g., 2 to 3 levels) enabling rapid traversal time from the root node to a leaf node. That is, no matter how many snapshots exist, references to the oldest data remain referenced by the newest snapshot resulting in a fixed number of node traversals to locate any data.

Operationally, retrieval of data blocks (snapshot data) by the LTSS data service from any snapshot stored in the archival storage system involves fetching the root of the index (B+ tree) data structure 700 associated with the snapshot from the snapshot configuration repository 660, using the offset/range of the snapshot data block(s) to be retrieved as a key to traverse the tree to the appropriate leaf node 730, which points to the location of the data blocks in the data object 540 of the object store 560. For incremental restoration of snapshot data, the technique further enables efficient computation of differences (deltas) between any two snapshots using the index metadata rather than information within the snapshot itself. In this manner, a delta between any two snapshots no matter how far apart (i.e., independent of a number of intervening snapshots) may be computed without accessing metadata of the intervening snapshots. In an embodiment, the LTSS data service performs the delta computations by accessing the snapshot configuration repository 660, identifying the root nodes 710 of the corresponding index data structures 700 (e.g., B+ trees) for the two snapshots, and traversing their internal nodes 720 all the way to the leaf nodes 730 of the index data structures to determine any commonality/overlap of values (i.e., unchanged data blocks). All leaf nodes 730 that are common to the B+ trees are thus eliminated, leaving the non-intersecting leaf nodes corresponding to the snapshots (i.e., data blocks unique to each snapshot representing changed data blocks). The leaf nodes of each tree are traversed to obtain a set of <logical offset, object ID, object offset> tuples and these tuples are compared to identify the different (delta) logical offset ranges between the two snapshots. These deltas then may be accessed from the data objects and provided to a requesting client.

The embodiments described herein are directed to a differencing technique that enables efficient retrieval of data from one of a substantial number of point-in-time images (e.g., snapshots) maintained over substantially long periods of time in a long-term storage service (LTSS) of an archival storage system. Illustratively, the LTSS service enables cloud storage for a substantial number (e.g., millions) of snapshots representing substantial amounts (e.g., terabytes) of data accumulated over long periods of time (e.g., decades) to be quickly and efficiently retrieved from cloud storage (e.g., an object store). The LTSS 600 efficiently retrieves the data by computing differences or deltas between any two (2) arbitrary snapshots independent of the number of intervening snapshots in accordance with a differencing procedure and without the need to examine metadata of the snapshots to determine which blocks of data have changed (i.e., the deltas) between the two arbitrary snapshots. Notably, the index data structures may be stored apart from the snapshots in a different repository.

According to the technique, the differencing procedure operates on one or more index data structures 700 configured to translate a logical offset range of snapshot data in a snapshot address space (e.g., of a file system) to a data object address space (e.g., of the object store hosting the snapshot data). In an embodiment, each snapshot is associated with its own index data (B+ tree) structure 700. By referencing/accessing a root node of each index data structure (e.g., the reference snapshot index tree and the restored snapshot index tree) and traversing internal and leaf nodes of the B+ trees to determine the deltas (Δs) at a high level, the differencing technique arrives at changed data blocks approximately in constant time. Note that the differences are determined by eliminating common nodes in the index data structures 700. The differencing technique is simple and efficient for computing differences (the Δs) between only two arbitrary snapshots, regardless of how far apart in time/distance (i.e., no matter how many intervening snapshots exist or an amount of archived changed data blocks), by comparing the index data structure nodes.

Figure 8:
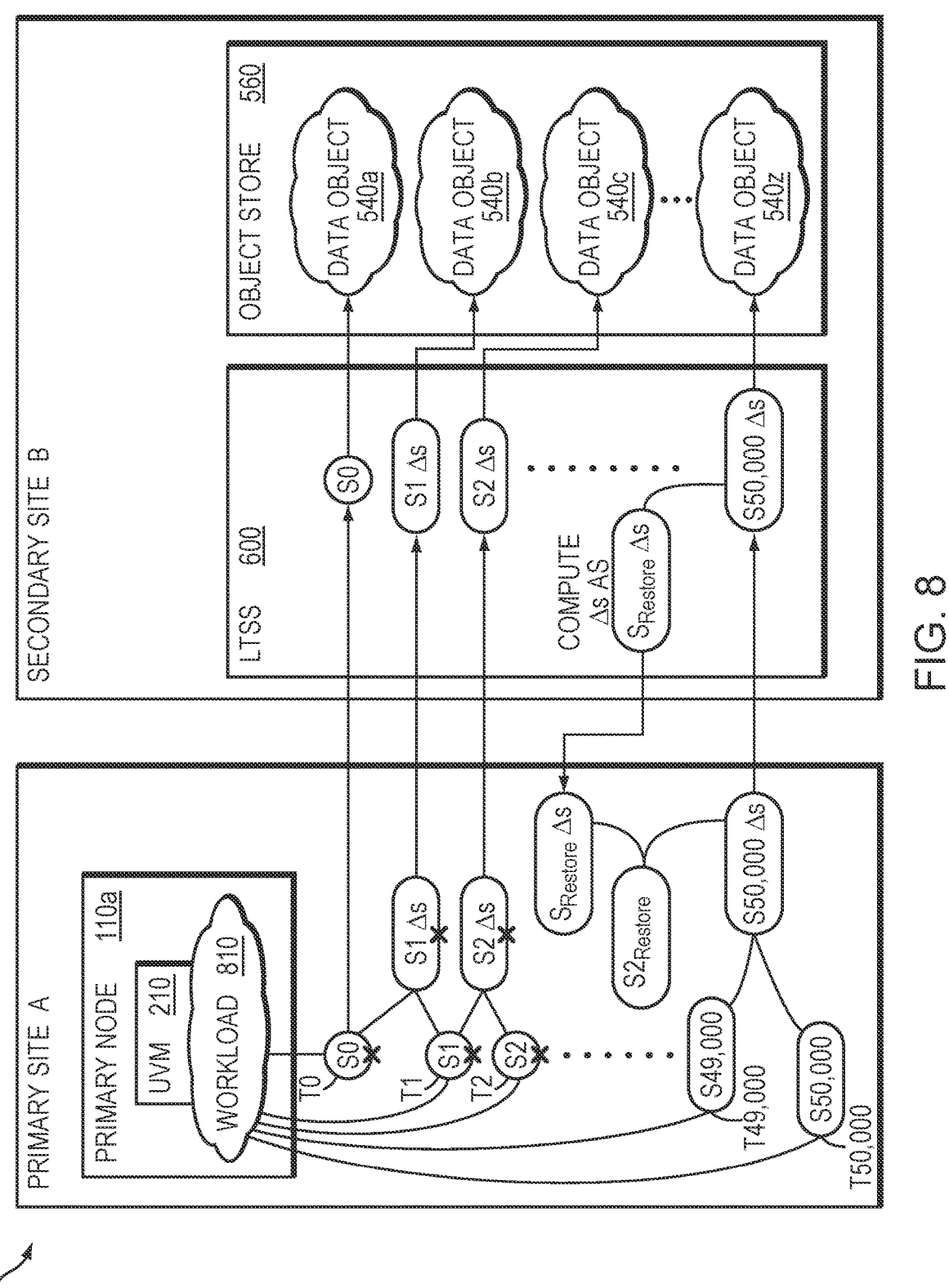
FIG. 8 is a block diagram of a differencing technique in accordance with the embodiments described herein.

FIG. 8 is a block diagram of the differencing technique 800. A replication environment, such as a backup or archival storage environment, includes a primary node 110a configured to create (generate) a snapshot S0 at a time T0 from a workload 810 at a primary site A of the environment. The snapshot S0 is fully replicated (e.g., via synchronous replication) to LTSS 600 at a secondary site B as snapshot S0 and stored as a data object 540a on the object store 560. Changes to the workload are tracked at a UVM 210 on the primary node 110a such that at time T1, another snapshot S1 is generated. The differences between S1 and S0 are computed and replicated (e.g., via asynchronous, incremental replication) to LTSS 600 on the secondary site B as S1 deltas (Δs) prior to storage on the object store 560 as data object 540*b*. At time T2, a snapshot S2 is generated and differences between S2 and S1 are computed and replicated to LTSS 600 at the secondary site B as S2 Δs prior to storage on the object store 560 as data object 540*c*. The generation and incremental replication of snapshot differences continues for a substantially large number (e.g., thousands) of generated snapshots where differences are computed at the primary site A and replicated as snapshot Δs to the secondary site B.

Note that the number of snapshots retained at the primary and secondary sites may differ depending on a retention policy. If the secondary site has cheap (e.g., cloud) storage, the retention policy may specify that many more snapshots are retained on the secondary site as compared to the primary site (which typically has more expensive storage). For example, the policy may specify that only the last one or two snapshots (e.g., S49,999 and S50,000) be retained on the primary site A (e.g., with the earlier generated snapshots being expired as denoted by X), whereas all of the substantially large number of snapshots are stored on the object store 560 and retained (maintained/archived) at the secondary site B.

Assume it is desirable to restore an old snapshot (e.g., S2) at the primary site A that was generated a substantially long time ago. However, it is costly (e.g., cloud storage vendor data extraction fees) and slow to retrieve the entire contents of old snapshot S2 from the secondary site B (e.g., because of cost in terms of amount of time and data). If a recent snapshot (e.g., S50,000 Δs) is available at the primary site A, LTSS 600 at the secondary site B may be instructed to compute the differences (Δs) between the recent snapshot S50,000 Δs and the old snapshot S2 Δs, and transmit the computed Δs as $S_{RESTORE\Delta s}$ to the primary node 110*a* at the primary site A, which uses those Δs to restore the old snapshot $S2_{RESTORE}$. That is, a recent copy of a snapshot at the primary site A may be used as a reference to restore the data (workload 810) of an old snapshot, which may be archived at the LTSS 600 of the secondary site B. To that end, LTSS 600 may be invoked to compute and provide the logical differences (Δs) needed to restore the snapshot data at the primary site A. Note that the reference snapshot is the snapshot that is common to both sites and that is used to compute the Δs needed to both replicate data to the secondary site and restore the data, e.g., of the old or desired snapshot, at the primary site.

In order to compute the differences between the recent (reference) snapshot and the old (restored) snapshot, LTSS 600 performs the differencing procedure that includes accessing the snapshot configuration repository 660 to determine the root nodes 710 of the index data structures ("index trees") 700 of the reference and restored snapshots. In an embodiment, the root nodes 710 may be determined by examining timestamps or VM/disk names of the snapshots. Note that the computations performed in accordance with the differencing procedure involves B+ tree differencing between two distinct index trees 700 without reference or examination of any intervening index trees (e.g., in between the reference and restored index trees). According to the technique, LTSS 600 determines whether the root nodes (and/or other nodes of the reference and restored index trees) are different or the same by scanning and comparing identifiers (IDs) of the nodes.

For example and referring to FIG. 7, each node of the index tree 700 has an ID, e.g., root node 710 has a root node ID, each internal node 720 has an internal node ID, and each leaf node 730 has a leaf node ID. If the root node IDs of the reference and restored index trees are the same, then there are no deltas (Δs) and, thus, no changes to the data between the snapshots. However, if the root node IDs are different, then the internal and leaf node ("child node") IDs of the index trees are examined. In an embodiment, LTSS 600 (i) scans the root node 710 of the index tree 700 for the snapshot to be restored and computes a list of internal node IDs as, e.g., set 1; (ii) scans the root node 710 of the index tree 700 for the reference snapshot and computes a list of internal node IDs as, e.g., set 2; and, (iii) performs a comparison/difference computation (e.g., a logical set subtraction) between sets 1 and 2. If an internal node ID of set 1 is found in set 2, that internal node ID is eliminated from set 1. This aspect of the differencing procedure is essentially an iterative reversal compare between first and second index trees 700 that removes (e.g., from the set 1 node ID list) any common internal node IDs, such that the final, resulting node ID list of set 1 represents the deltas (Δs) or changed data between the restored and referenced snapshots. Essentially, the differencing procedure is used to compute the differences between the two index trees so as to restore an old, archived snapshot back to a desired, restore snapshot at the primary site.

Figure 9A:
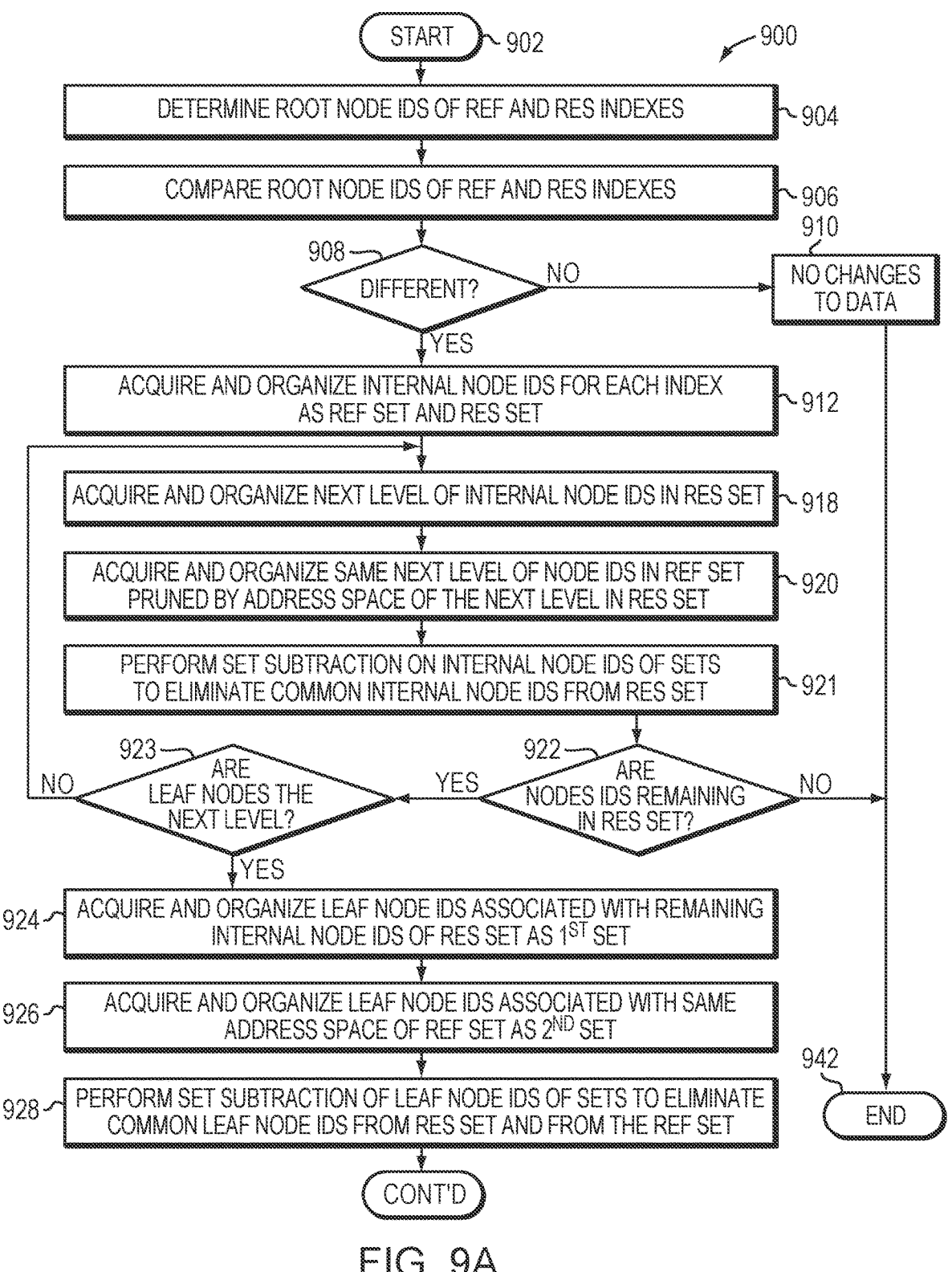
FIG. 9A is a flowchart illustrating a differencing procedure of the differencing technique.
Figure 9B:
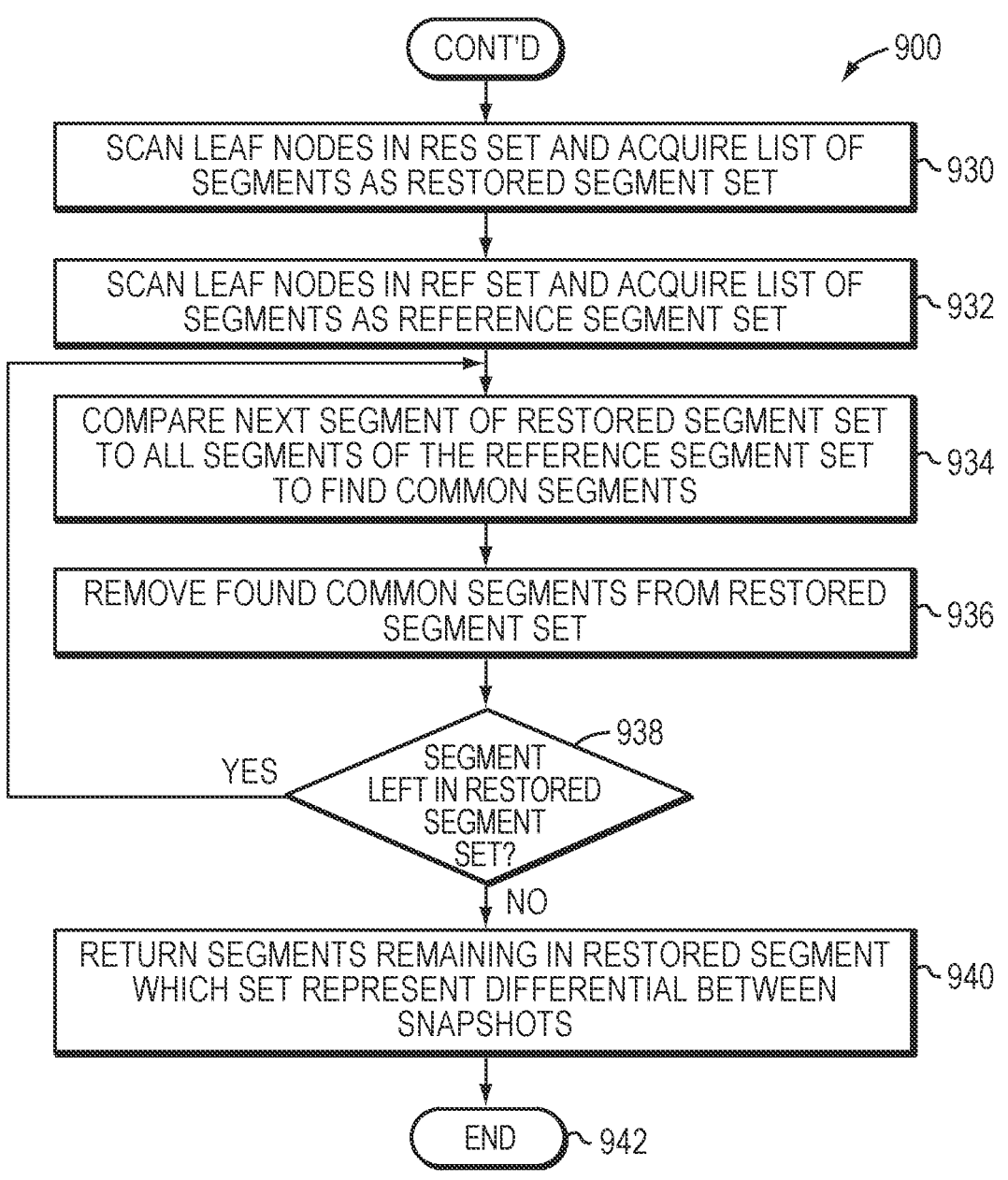
FIG. 9B is a continuation of the flowchart illustrating the differencing procedure of the differencing technique.

FIG. 9 is a flowchart illustrating the differencing procedure 900 of the differencing technique 800. As noted, the differencing procedure is illustratively performed by LTSS 600 in accordance with an index tree 700 that is configured to translate a logical offset range of snapshot data in a snapshot address space (e.g., of a file system) to a data object address space (e.g., of an object store 560 hosting the snapshot data). The differencing procedure 900 starts at block 902 and proceeds to block 904 where LTSS accesses the snapshot configuration repository to determine the root node IDs of the index trees ("indexes") of the reference (ref) and restored (res) snapshots that are used to compute the differences (Δs). At block 906, the root node IDs of the reference and restored indexes are compared and, at block 908, a determination is rendered as to whether the root nodes are different.

If the root nodes of the reference and restored indexes are not different (i.e., the same), then there are no deltas (Δs) and, at block 910, there are no changes to the data between the snapshots. The procedure ends at block 942. If, however, the root nodes are different, then the internal and leaf nodes ("child nodes") of the indexes are examined and compared. Illustratively, at block 912, the internal nodes of each index are scanned to acquire and organize (i.e., extract) their internal node IDs into separate data structures as separate sets, e.g., a reference set of internal node IDs and a restored set of internal node IDs.

At block 918, the internal nodes IDs in the restored set are scanned to acquire and organize the next level child (e.g., internal) node IDs in the restored set and, at block 920, the same next level of internal node IDs pruned by the address space of the next child level of the restored set (i.e.,) are scanned to acquire and organize the next child level (e.g., internal) node IDs in the reference set. Illustratively, at block 921, a logical set subtraction is performed of the internal node IDs in the reference set from the internal node IDs in the restored set such that all internal node IDs of restored set that are found in (are common to) the reference set are eliminated from restored set. Notably missing address ranges of the node IDs are denoted (assumed) as having no data (i.e., empty) for the set subtraction. Illustratively, if a node (e.g., an internal node) is the same (and, thus, shared) between the reference and restored indexes, then the entire sub-tree below the shared node (e.g., including leaf nodes) is common between the trees. Accordingly, the shared node and sub-tree are not (and do not) constitute deltas (Δs) or changed data between their respective snapshots.

At block 922, a determination is rendered as to whether there are any internal node IDs remaining in the restored set (e.g., set 1). Illustratively, the scanning, acquiring, and organization of internal node IDs into sets may be performed on a level-by-level basis for each index. If there are no internal node IDs remaining, the procedure ends at block 942. Otherwise, at block 923 another determination is made whether the next child level contains leaf node IDs (i.e., whether the index tree has been traversed to the leaf nodes). If the next level are not the leaf node IDs, the tree comparison has not yet traversed to the bottom and some internal node IDs of the restored set that are different (not common) to the reference set still remain. The procedure then returns to block 918, where blocks 918 through 922 are repeated until all internal node IDs (and hence subtrees) that are common between the restored and reference sets are eliminated.

At block 924, the leaf node IDs associated with remaining internal nodes of the restored set/index tree are scanned to acquire and organize (i.e., extract) their leaf node IDs as a $1^{st}$ set and, at block 926, the leaf node IDs of the same address space (i.e., associated with remaining leaf node IDs of the reference set/index tree) are scanned to acquire and organize their leaf nodes as a $2^{nd}$ set. At block 928, a logical set subtraction of the leaf node IDs of the sets is performed to eliminate all leaf node IDs of the restored set that are found in (common to) the reference set and to the restored set (i.e., the common leaf nodes are eliminated from both sets). Accordingly, only the leaf node IDs of the restored set that are different (not common) to the reference set remain, which IDs represent leaf node entries describing extents having an exact set of offset ranges in the data objects that contain the deltas (Δs) or changed data.

At block 930, leaf nodes of the RES set are scanned to acquire a list of segments/extents as a restored segment set. Similarly at block 932, leaf nodes of the REF set are scanned to acquire a list of segments as a reference segment set. Next at blocks 934 to 938, a comparison across these segment sets is performed so that common segments/extents can be removed, as these segments/extents point to the same object offset ranges having the same data. Illustratively, at step 934, a next segment/extent of the restored segment set (i.e., a next element from the set) is compared by location and identity to that of all the segments/extents of the reference set so that segments/extents referencing the same object at the same offset (i.e., point to the same data) are found to be (designated as) common. Specifically, segments based on, e.g., <disk offset, Object ID, object offset, length> relating to the remaining leaf node entries is determined (e.g., locations computed). At step 936, the common segments/extents found are removed from the restored segment set. At block 938 a determination is made whether any segment is left in the restored segment set; if so, the procedure iterates back to block 934. When all segments/extents of the restored segment set have been compared, the procedure continues to block 940 where the segments/extents that remain in the restored segment set representing the differential between the snapshots may be returned, That is, remaining elements of the restored segment set points to a data object (vdisk) which contains the changed data. The procedure then ends at block 942. Note that for any leaf node entries with overlapping extents, LTSS subtracts the overlapping range from the child range. That is, although the remaining leaf node entries are unique to the restored snapshot, those leaf nodes are also examined in the reference snapshot because their offsets into the data object(s) may intersect. Therefore, for every overlapping extent, an examination (e.g., comparison) is performed to determine whether the extent is contained (e.g., within the same location) in same data object. If so, the extent is common between the restored and reference snapshots and is eliminated from the final set of ranges that constitute the deltas (Δs) or changed data. Note that even if the extents overlap, if they are contained in different data objects, they are unique and represent changed data.

In an embodiment, the differencing technique involves a 2-phase differing analysis that includes an initial differing comparison in a virtual address space of the snapshots (e.g., in the file system) to determine virtual address blocks that are different, and then a subsequent differing comparison in a physical address space of the data objects (e.g., in the object store) to determine physical address blocks containing the actual deltas (Δs) or changed data. The technique thus eliminates (removes) any common nodes at all levels of the restored and reference snapshot index trees and, ultimately, retains only the leaf node entries that are unique to the restored snapshot (and not present in the reference snapshot), so that merely blocks unique to the restored snapshot need be retrieved from the data objects.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for restoring data from an archival storage system comprising:

retrieving first and second index data structures each organized as a tree mapping a first address space of first and second snapshots respectively to a second address space of data objects stored at the archival storage system, wherein each node of the trees includes an identifier (ID) associated with a respective data object, wherein the index data structures reference data objects across an arbitrary number of snapshots;

organizing a reference (REF) set based on the first snapshot and a restore (RES) set based on the second snapshot;

acquiring a next level of node IDs from the first snapshot in the REF set;

acquiring a same next level of node IDs from the second snapshot pruned by the first address space in the RES set;

performing a first set subtraction of the REF set from the RES set to update the RES set; and restoring the data from the data objects based on remaining node IDs in the subtracted RES set.

2. The method of claim 1 further comprising:

determining whether any data is changed from the first snapshot to the second snapshot by comparing a root node ID of the first and second index data structures; and in response to determining that the root node IDs are identical, indicating that no data is changed between the first and second snapshots.

3. The method of claim 1 further comprising:

organizing leaf nodes IDs from the remaining node IDs of the REF set into a first set;

organizing the leaf node IDs from the remaining node IDs in the subtracted RES set into a second set;

performing a second set subtraction of the first set from the second set; and determining a remaining set of extents stored in the data objects related to remaining leaf nodes IDs from the subtracted second set.

4. The method of claim 3 further comprising:

determining whether the next level of nodes in the subtracted RES set are leaf nodes; and in response to determining that the next level of nodes in the subtracted RES set are leaf nodes, computing locations of a remaining set of extents stored in the data objects related to the remaining leaf nodes IDs from the second set.

5. The method of claim 1 further comprising:

determining whether node IDs remain in the subtracted RES set; and in response to determining that node IDs remain in the subtracted RES set, indicating that no data is changed between the first and second snapshots.

6. The method of claim 1 further comprising:

replicating the first snapshot from a primary site to the archival storage system; and creating the first index data structure for retrieval via a long-term storage service.

7. The method of claim 1, wherein the first address space is native to a file system of the snapshots and the second address space is of the data objects of the archival storage system.

8. The method of claim 1, wherein missing address ranges of the node IDs are denoted as having no data for the set subtraction.

9. The method of claim 1, wherein leaf nodes of the index data structures include location information of extents in the data objects.

10. A non-transitory computer readable medium including program instructions for execution on a processor, the program instructions configured to:

retrieve first and second index data structures each organized as a tree mapping a first address space of first and second snapshots respectively to a second address space of data objects stored at an archival storage system, wherein each node of the trees includes an identifier (ID) associated with a respective data object, wherein the index data structures reference data objects across an arbitrary number of snapshots;

organize a reference (REF) set based on the first snapshot and a restore (RES) set based on the second snapshot;

acquire a next level of node IDs from the first snapshot in the REF set;

acquire a same next level of node IDs from the second snapshot pruned by the first address space in the RES set;

perform a first set subtraction of the REF set from the RES set to update the RES set; and restore the data from the data objects based on remaining node IDs in the subtracted RES set.

11. The non-transitory computer readable medium of claim 10, wherein the program instructions further include program instructions configured to:

determine whether any data is changed from the first snapshot to the second snapshot by comparing a root node ID of the first and second index data structures; and in response to determining that the root node IDs are identical, indicate that no data is changed between the first and second snapshots.

12. The non-transitory computer readable medium of claim 10, wherein the program instructions further include program instructions configured to:

organize leaf nodes IDs from the remaining node IDs of the REF set into a first set;

organize the leaf node IDs from the remaining node IDs in the subtracted RES set into a second set;

perform a second set subtraction of the first set from the second set; and determine a remaining set of extents stored in the data objects related to remaining leaf nodes IDs from the subtracted second set.

13. The non-transitory computer readable medium of claim 12, wherein the program instructions further include program instructions configured to:

determine whether the next level of nodes in the subtracted RES set are leaf nodes; and in response to determining that the next level of nodes in the subtracted RES set are leaf nodes, compute locations of a remaining set of extents stored in the data objects related to the remaining leaf nodes IDs from the second set.

14. The non-transitory computer readable medium of claim 10, wherein the program instructions further include program instructions configured to:

determine whether node IDs remain in the subtracted RES set; and in response to determining that node IDs remain in the subtracted RES set, indicate that no data is changed between the first and second snapshots.

15. The non-transitory computer readable medium of claim 10, wherein the program instructions further include program instructions configured to:

replicate the first snapshot from a primary site to the archival storage system; and create the first index data structure for retrieval via a long-term storage service.

16. The non-transitory computer readable medium of claim 10, wherein the first address space is native to a file system of the snapshots and the second address space is of the data objects of the archival storage system.

17. The non-transitory computer readable medium of claim 10, wherein missing address ranges of the node IDs are denoted as having no data for the set subtraction.

18. The non-transitory computer readable medium of claim 10, wherein leaf nodes of the index data structures include location information of extents in the data objects.

19. An apparatus comprising:

a long-term storage service (LTSS) of an archival storage system, the LTSS configured to execute on a processor that is further configured to execute program instructions to, retrieve first and second index data structures each organized as a tree mapping a first address space of first and second snapshots respectively to a second address space of data objects stored at an archival storage system, wherein each node of the trees includes an identifier (ID) associated with a respective data object, wherein the index data structures reference data objects across an arbitrary number of snapshots;

organize a reference (REF) set based on the first snapshot and a restore (RES) set based on the second snapshot;

acquire a next level of node IDs from the first snapshot in the REF set;

acquire a same next level of node IDs from the second snapshot pruned by the first address space in the RES set;

perform a first set subtraction of the REF set from the RES set to update the RES set; and restore the data from the data objects based on remaining node IDs in the subtracted RES set.

20. The apparatus of claim 19 wherein the program instructions further include program instructions to:

determine whether any data is changed from the first snapshot to the second snapshot by comparing a root node ID of the first and second index data structures; and in response to determining that the root node IDs are identical, indicate that no data is changed between the first and second snapshots.

21. The apparatus of claim 19 wherein the program instructions further include program instructions to:

organize leaf nodes IDs from the remaining node IDs of the REF set into a first set;

organize the leaf node IDs from the remaining node IDs in the subtracted RES set into a second set;

perform a second set subtraction of the first set from the second set; and determine a remaining set of extents stored in the data objects related to remaining leaf nodes IDs from the subtracted second set.

22. The apparatus of claim 21 wherein the program instructions further include program instructions to:

determine whether the next level of nodes in the subtracted RES set are leaf nodes; and in response to determining that the next level of nodes in the subtracted RES set are leaf nodes, compute locations of a remaining set of extents stored in the data objects related to the remaining leaf nodes IDs from the second set.

23. The apparatus of claim 19 wherein the program instructions further include program instructions to:

determine whether node IDs remain in the subtracted RES set; and in response to determining that node IDs remain in the subtracted RES set, indicate that no data is changed between the first and second snapshots.

24. The apparatus of claim 19 wherein the program instructions further include program instructions to:

replicate the first snapshot from a primary site to the archival storage system; and create the first index data structure for retrieval via a long-term storage service.

25. The apparatus of claim 19, wherein the first address space is native to a file system of the snapshots and the second address space is of the data objects of the archival storage system.

26. The apparatus of claim 19, wherein missing address ranges of the node IDs are denoted as having no data for the set subtraction.

27. The apparatus of claim 19, wherein leaf nodes of the index data structures include location information of extents in the data objects.

* * * * *